United States Patent Office 3,708,538
Patented Jan. 2, 1973

---

3,708,538
N-FLUOROALKYL-SULFONAMIDES AND PROCESS FOR PREPARING THEM
Helmut Hahn, Burghausen, Salzach, Ottto Scherer, Bad Soden, Taunus, and Siegfried Rebsdat, Altotting, Germany, assignors to Farbwerke Hoechst Aktiengesellschaft vormals Meister Lucius & Bruning, Frankfurt am Main, Germany
No Drawing. Filed July 29, 1970, Ser. No. 59,363
Int. Cl. C07c *143/74, 143/78*
U.S. Cl. 260—556 A          4 Claims

ABSTRACT OF THE DISCLOSURE

New stable sulfonamides containing a $CF_2$ group adjacent to nitrogen are obtained by reacting N-mono-substituted sulfonamides with fluoro-olefins or the alkali metal salts of said sulfonamides with fluoro-haloalkanes. The products are useful as reactive intermediates for a variety of organic syntheses and—owing to their polarity and high boiling points—as valuable solvents for sparingly soluble organic or inorganic compounds.

---

The present invention relates to novel N-fluoroalkyl sulfonamides and processes for preparing them.

It is known that fluoro-olefins, for example trifluoro-chloroethylene, tetrafluoro-ethylene or difluoro-chloroethylene can be added on alcohols, amines, diamines or even oximes to yield, for example, products that carry two fluorine atoms linked to the carbon atom in adjacent position to the nitrogen atom, the bond being, however, so weak that they already react with hydrogen cyanide to yield a dinitrile and hydrogen fluoride (as disclosed in U.S. Pat. No. 2,883,388) or with cold water to yield the corresponding carbonamide and hydrogen fluoride:

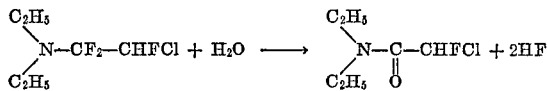

(J. Am. Chem. Soc. 72, p. 3649 (1950), Preuttetal).

It has now been found that stable fluorinated compounds having a $CF_2$ group adjacent to the nitrogen are obtained by reacting fluoro-olefins with N-alkyl or N-aryl-sulfonamides in the presence of alkalis:

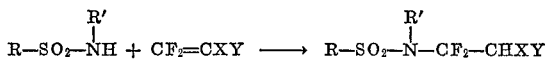

In this reaction equation R stands for alkyl or an unsubstituted or substituted aromatic radical, R' for an aliphatic radical containing 1 to 12 carbon atoms, a cycloaliphatic radical or a substituted or unsubstituted aromatic radical, X for hydrogen, fluorine, chlorine or bromine, Y for fluorine, chlorine or bromine or a perfluorinated aliphatic radical, for example $CF_3$.

The alkalis used for the above condensation may be alkali metal hydroxides or alkali metals.

As sulfonamides there may, for example, be used: N-alkylphenyl sulfonamides such as N-methyl, N-ethyl, N-butyl or N-dodecyl-benzene sulfonamide, the corresponding compounds substituted in the phenyl nucleus, such as N-alkyl-chlorophenyl sulfonamide or N-alkyl-nitrochlorophenyl sulfonamide or N-alkyl-aminophenyl sulfonamide. N-cycloalkyl sulfonamides or N-aryl sulfonamides may likewise be used, for example toluene-sulfanilide. Finally, N-fluoroalkyl sulfonamides may also be prepared from corresponding aliphatic sulfonamides, for example N-methyl-methyl-sulfonic acid amide or N-butyl-propyl-sulfonic acid amide. Upon reaction with alkali metal hydroxide in water or alcohol all these sulfonamides easily yield the corresponding alkali metal salts.

Suitable fluoro-olefins are all olefins which also react in known manner with alcohols or phenols to yield ethers, for example tetrafluoro-ethylene, trifluoro-chloroethylene, hexafluoro-propylene, 1,1 - difluoro-2,2-dichloro-ethylene, 1,1-difluoro-2-chloroethylene or trifluoro-bromoethylene.

The N-fluoroalkyl sulfonamides of the invention may also be obtained using, instead of the fluoro-olefins to be reacted, fluoro-alkanes that can be converted into fluoro-olefins by splitting off hydrogen halide. The reaction component is in this case an alkali metal salt of the mentioned sulfonamides. This preparation method does not require additional use of alkalis.

The N-fluoroalkyl sulfonamides are formed according to the following reaction scheme:

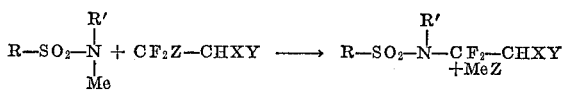

in which Me stands for an alkali metal such as sodium, potassium or lithium and Z for chlorine or bromine, and R, R', X and Y are defined as above.

As fluoroalkanes that can be converted into fluoro-olefins there may be mentioned, above all: 1,2-difluoro-1,2,2-trichloroethane, 1,1,2 - trifluoro-1,2-dichloroethane, 1,1,2,2-tetrafluoro-1-bromoethane as well as 1,1,1,2,3,3-hexafluoro-3-bromo-propane.

The reactions of the invention are preferably carried out in polar solvents; dimethylformamide or dimethylsulfoxide has proved especially suitable. The sulfonamide is dissolved in these solvents, a small amount of alkali is added and the reaction which in most cases is exothermic, is started by introducing the fluoro-olefin. According to the other method of the invention, the alkali metal salt of the sulfonamide is dissolved in one of the above solvents and one of the above fluoro-halo-alkanes is added dropwise, whereupon an alkali metal halide is formed as a by-product.

The simple addition of fluoro-olefins on sulfonamides to be generally effected at normal pressure is surprising since it could not be expected that the strongly acid hydrogen atom of the sulfonamide would react as easily as disclosed above and thus open the way to the stable N-fluoroalkyl sulfonamides.

The so-obtained N-fluoroalkyl sulfonamides are novel stable compounds that can be used as valuable reactive components for the manufacture of dyestuffs, pharmaceuticals, pesticides or textile auxiliaries. In view of their distinct polarity and owing to their high boiling points the new compounds are valuable solvents for sparingly soluble inorganic and organic compounds, e.g. betaines and high molecular fluorocarbon compounds, especially poly tetrafluoro-ethylene waxes and polytrifluoro-chloro-ethylenes. If the new compounds are solid at room temperature they can be used as melts or they may be mixed in the solid state with the product to be dissolved and heated together until liquidification.

The following examples serve to illustrate the invention.

EXAMPLE 1

0.3 g. of sodium was added to a solution of 93 g. of N-ethylbenzene sulfonamide in 250 ml. of dimethylformamide and then a gas stream of trifluoro-chloroethylene was fed in until no more olefin was absorbed. The temperature rose to 50° C. and the reaction was complete after 1.5 hours. The reaction product was then introduced into water, the organic phase was taken up with 300 ml. of methylene chloride and the methylene chloride extract was shaken with sodium hydroxide solution and water.

After drying over sodium sulfate the methylene chloride was evaporated. 107 g. of a crude product were obtained, from which N-ethyl-N-trifluoro-chloroethyl-benzene sulfonamide was distilled in an amount of 82 grams. Boiling point 136–138° C. under 2 torr.

Elementary analysis.—$C_{10}H_{11}ClF_3NO_2S$ (molecular weight: 301.5). Found (percent): N, 4.9; Cl, 11.5; F, 18.5. Calculated (percent): N, 4.7; Cl, 11.8; F, 18.9.

EXAMPLE 2

1 g. of sodium was added to a solution of 100 g. of N-ethyl-p-methyl-phenyl sulfonamide in 200 ml. of dimethylformamide and the mixture was treated as disclosed in Example 1 with trifluoro-chloroethylene and worked up in the same manner. 176 g. of crude products were obtained, from which 125 g. of N-ethyl-N-trifluoro-chloroethyl-p-methylphenyl sulfonamide were distilled. Boiling point: 148–152° C. under 1 to 2 torr.

Elementary analysis.—$C_9H_7Cl_3F_3NO_2S$ (molecular weight: 315.5). Found (percent): N, 4.5; Cl, 11.4; F, 17.9. Calculated (percent): N, 4.4; Cl, 11.3; F, 18.2.

EXAMPLE 3

As disclosed in Example 1, 80 g. of N-methyl-3,4-dichlorophenyl sulfonamide in 100 ml. of dimethylformamide were reacted with trifluoro-chloroethylene in the presence of 1 g. of sodium. The temperature rose to 60° C. After the usual working up according to Example 1, 104 g. of N-methyl-N-trifluoro-chloroethyl-3,4-dichlorophenyl sulfonamide were obtained. Boiling point: 155–156° C. under 0.4 torr.

Elementary analysis.—$C_9H_7Cl_3F_3NO_2S$ (molecular weight: 356.5). Found (percent): N, 4.5; Cl, 11.8; F, 18.7. Calculated (percent): N, 4.7; Cl, 11.8; F, 18.9.

EXAMPLE 4

From 93 g. of N-methyl-p-methylphenyl sulfonamide in 100 ml. of dimethylformamide and 1 g. of sodium, 124 g. of N-methyl-N-trifluoro-chloroethyl-p-methyl-phenyl sulfonamide were obtained according to the method disclosed in Example 1. Boiling point: 142–144° C. under 1.6 torr.

Elementary analysis.—$C_{10}H_{11}ClF_3NO_2S$ (molecular weight: 301.5).—Found (percent): N, 4.5; Cl, 11.8; F, 18.7. Calculated (percent): N, 4.7; Cl, 11.8; F, 18.9.

EXAMPLE 5

132 g. of N-ethyl-p-methylphenyl sulfonamide were dissolved in 150 ml. of dimethylformamide and 1.2 g. of sodium were added. At 50–60° C. 100 g. of perfluoro propene were fed in within about 2.5 hours. After the work-up as disclosed in Example 1, 153 g. of N-ethyl-N-hexafluoropropyl - p - methylphenyl sulfonamide were obtained. Boiling point: 132–134° C. under 0.7 torr.

Elementary analysis.—$C_{12}H_{13}F_6NO_2S$ (molecular weight: 349). Found (percent): N, 4.3; F, 32.2. Calculated (percent): N, 4.0; F, 32.7.

EXAMPLE 6

55 g. of N-methyl-methane sulfonamide were dissolved in 100 ml. of dimethylformamide and 1 g. of sodium was added. Trifluoro-chloroethylene was fed in until no more olefin was absorbed. The temperature rose to 78° C. Stirring was continued for 0.5 to 1 hour and then the product was worked up as disclosed in Example 1. 85 g. of N-methyl-N-trifluoro-chloroethylmethane sulfonamide were obtained. Boiling point: 70–73° C. under 1.3 torr.

Elementary analysis.—$C_4H_7ClF_3NO_2S$ (molecular weight: 225.5). Found (percent): N, 6.8; Cl, 15.8; F, 25.3. Calculated (percent): N, 6.2; Cl, 15.8; F, 25.0.

EXAMPLE 7

85 g. of 1,1-difluoro-1,2,2-trichloroethane were added dropwise within about 30 minutes to a solution of 145 g. of the sodium salt of N-methyl-3,4-dichlorophenyl sulfonamide in 300 ml. of dimethylformamide; the temperature rose to about 50° C. and was then maintained for 1.5 hours at 70–80° C. The cooled reaction product was then poured onto water, shaken with methylene chloride, washed successively with sodium hydroxide solution and water and, after distillation of the readily volatile solvents, 146 g. of N-methyl-N-α,α-difluoro-β,β-dichloroethyl-3,4-dichlorophenyl sulfonamide were obtained. Melting point 42–43° C.

Elementary analysis.—$C_9H_7Cl_4F_2NO_2S$ (molecular weight: 373). Found (percent): N, 3.8; Cl, 38.1; F, 9.6. Calculated (percent): N, 3.8; Cl, 38.0; F, 10.0.

EXAMPLE 8

According to the method of Example 7, 49 g. of 1,1-difluoro-1,2,2-trichloroethane were reacted with 80 g. of the sodium salt of N-methyl-3-nitro-4-chlorophenyl sulfonamide in 200 ml. of dimethylformamide to yield 84 g. of N - methyl-N-α,α-difluoro-β,β-dichloroethyl-3-nitro-4-chlorophenyl sulfonamide, M.P. 45–46° C.

Elementary analysis.—$C_9H_7Cl_3F_2N_2O_4S$ (molecular weight: 383.5). Found (percent): N, 7.8; Cl, 27.6; F, 9.7. Calculated (percent): N, 7.3; Cl, 27.9; F, 9.9.

EXAMPLE 9

0.3 g. of sodium was dissolved while heating in 42.8 g. of N-methyl-benzene sulfonamide and 30 ml. of dimethylsulfoxide were poured thereon. Subsequently, tetrafluoroethylene was fed in at 105° C. while vigorously stirring under normal pressure in such an amount that no olefin escaped through the succeeding bubble counter. The reaction was complete after 2.5 hours. The reaction product was then placed on ice, shaken with ether, the ether solution was dried over calcium chloride and the ether was evaporated. By distillation of the residue 47.1 g. of N-methyl-N-tetrafluoroethyl-benzene sulfonamide were obtained. Boiling point: 146° C. under 13 torr.

Elementary analysis.—$C_9H_9F_4NO_2S$ (molecular weight: 271). Found (percent): C, 40.2; H, 3.5; F, 27.7; N, 5.3; S, 12.1. Calculated (percent): C, 39.9; H, 3.3; F, 28.0; N, 5.2; S, 11.8.

EXAMPLE 10

150 g. of the sodium salt of p-toluene-sulfanilide were introduced into 300 ml. of dimethylformamide. 85 g. of 1,1-difluoro-1,2,2-trichloroethane were added dropwise thereto within half an hour, whereupon the temperature rose to 34° C. Then the temperature was raised and kept for 2 hours at 70–80° C. According to the work-up disclosed in Example 7, 98 g. of N-α,α-difluoro-β,β-dichloroethyl-p-toluene-sulfanilide were obtained.

Elementary analysis.—$C_{15}H_{13}Cl_2F_2NO_2S$ (molecular weight: 380). Found (percent): Cl, 19.0; F, 9.3. Calculated (percent): Cl, 18.7; F, 10.0.

EXAMPLE 11

85 g. of 1,1-difluoro-1,2,2-trichloroethane were added dropwise within half an hour to a solution of 106 g. of the sodium salt of N-methyl-benzene sulfonamide in 250 ml. of dimethylformamide, whereupon the temperature rose to 60° C. The mixture was heated for another hour to 60–70° C. and the product was worked up as disclosed in Example 7. 79 g. of N-methyl-N-α,α-difluoro-β,β-dichloroethyl-benzene sulfonamide were obtained. Boiling point: 123–126° C. under 0.15 torr.

Elementary analysis.—$C_{11}H_{13}ClF_3NO_2S$ (molecular weight: 304). Found (percent): Cl, 23.4; F, 11.9. Calculated (percent): Cl, 23.4; F, 12.5.

EXAMPLE 12

3 g. of powdered KOH were added to a solution of 17 g. of N-ethyl-p-methylphenyl sulfonamide in 50 ml. of dimethylformamide and the trifluoro-chloroethylene was fed in. The temperature rose to 73° C.; after an hour the reaction was complete. The reaction product was worked up as in Example 1. 24.5 g. of N-ethyl-N-(α,α,β-trifluoro-β-chloro) - ethyl-p-methylbenzene sulfonamide were obtained. Boiling point: 144° C. under 1.5 torr.

*Elementary analysis.*—$C_{11}H_{13}ClF_3NO_2S$ (molecular weight: 315.5). Calculated (percent): N, 4.4; Cl, 11.3. Found (percent): N, 4.4; Cl, 11.0.

EXAMPLE 13

A stream of trifluorochloroethylene was fed into a solution of 80 g. of N-methyl-benzene sulfonamide and 12 g. of the sodium salt of this sulfonamide in 220 ml. of dimethylformamide. After working up and distillation 138.4 g. of N-methyl-N-($\alpha,\alpha,\beta$-trifluoro-$\beta$-chloro)-ethylbenzene sulfonamide were obtained. Boiling point: 115° C. under 1.2 torr.

*Elementary analysis.*—$C_9H_9ClF_3NO_2S$ (molecular weight: 287.5). Calculated (percent): C, 37.6; H, 3.1; N, 4.9. Found (percent): C, 37.9; H, 3.3; N, 5.0.

EXAMPLE 14

A stream of tetrafluoroethylene was fed within 4 hours at 80–90° C. into a solution of 90 g. of N-methyl-benzene sulfonamide and 12 g. of the sodium salt of the N-methyl-benzene sulfonamide in 150 ml. of dimethylformamide. After working up according to Example 1, 141 g. of N-methyl - N - tetrafluoro-ethyl-benzene sulfonamide were obtained. Boiling point: 104–105° C. under 1 torr (cf. Example 9).

In the manner as set forth above the following compounds were prepared:

| Ex. | R | R' | X | Y | Melting point/ Boiling point |
|---|---|---|---|---|---|
| 15[1] |  | n-C₄H₉ | F | F | M.P. 63–65° C. |
| 16[1] | 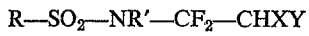 | n-C₄H₉ | F | Cl | M.P. 51° C. |
| 17 | C₆H₅ | 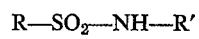 | F | Cl | M.P. 60° C. |
| 18 | n-C₈H₁₇ | n-C₁₂H₂₅ | F | Cl | M.P. 55° C. |
| 19 | 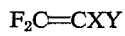 | n-C₄H₉ | F | Cl | Boiling point under 0.3 torr 155–166° C. |

[1] With KOH as alkali metal.

We claim:
1. A compound of the formula

$$R-SO_2-NR'-CF_2-CHXY$$

in which R is alkyl of 1 to 18 carbon atoms, phenyl, lower-alkylphenyl, halophenyl, dihalophenyl, halonitrophenyl, aminophenyl or naphthyl, R' is alkyl of 1 to 18 carbon atoms, cyclohexyl, phenyl or naphthyl, X is hydrogen, fluorine, chlorine or bromine and Y is fluorine, chlorine, bromine or lower perfluoroalkyl.

2. The compound as claimed in claim 1, wherein R is alkyl of 1 to 8 carbon atoms, phenyl, lower-alkylphenyl, halophenyl, dihalophenyl, halonitro-phenyl or naphthyl, R' is alkyl of 1 to 12 carbon atoms, cyclohexyl, phenyl or naphthyl, X is fluorine or chlorine and Y is fluorine, chlorine or lower perfluoroalkyl.

3. A process for the preparation of a compound of the formula $$R-SO_2-NR'-CF_2-CHXY$$

in which R is alkyl of 1 to 18 carbon atoms or an aromatic radical of the benzene or naphthalene series, R' is alkyl of 1 to 18 carbon atoms, cyclohexyl or an aromatic radical of the benzene or naphthalene series, X is hydrogen, fluorine, chlorine or bromine and Y is fluorine, chlorine, bromine or lower perfluoroalkyl, which comprises reacting a compound of the formula $$R-SO_2-NH-R'$$

in which R and R' are as defined above, with a compound of the formula $$F_2C=CXY$$

in which X and Y are as defined above, with a catalytic amount of an alkaline agent at a temperature of 0 to 120° C.

4. The process as claimed in claim 3, wherein the alkaline agent is sodium, potassium, sodium hydroxide or potassium hydroxide.

References Cited

Jacs, vol. 72; 3646 (1950), Pruett et al.

HENRY R. JILES, Primary Examiner

S. D. WINTERS, Assistant Examiner

U.S. Cl. X.R.

260—556 AR, 556 B, 583 GG, 561 HL, 30.8 R, 501.11, 653.1 R